United States Patent Office 2,946,240
Patented July 26, 1960

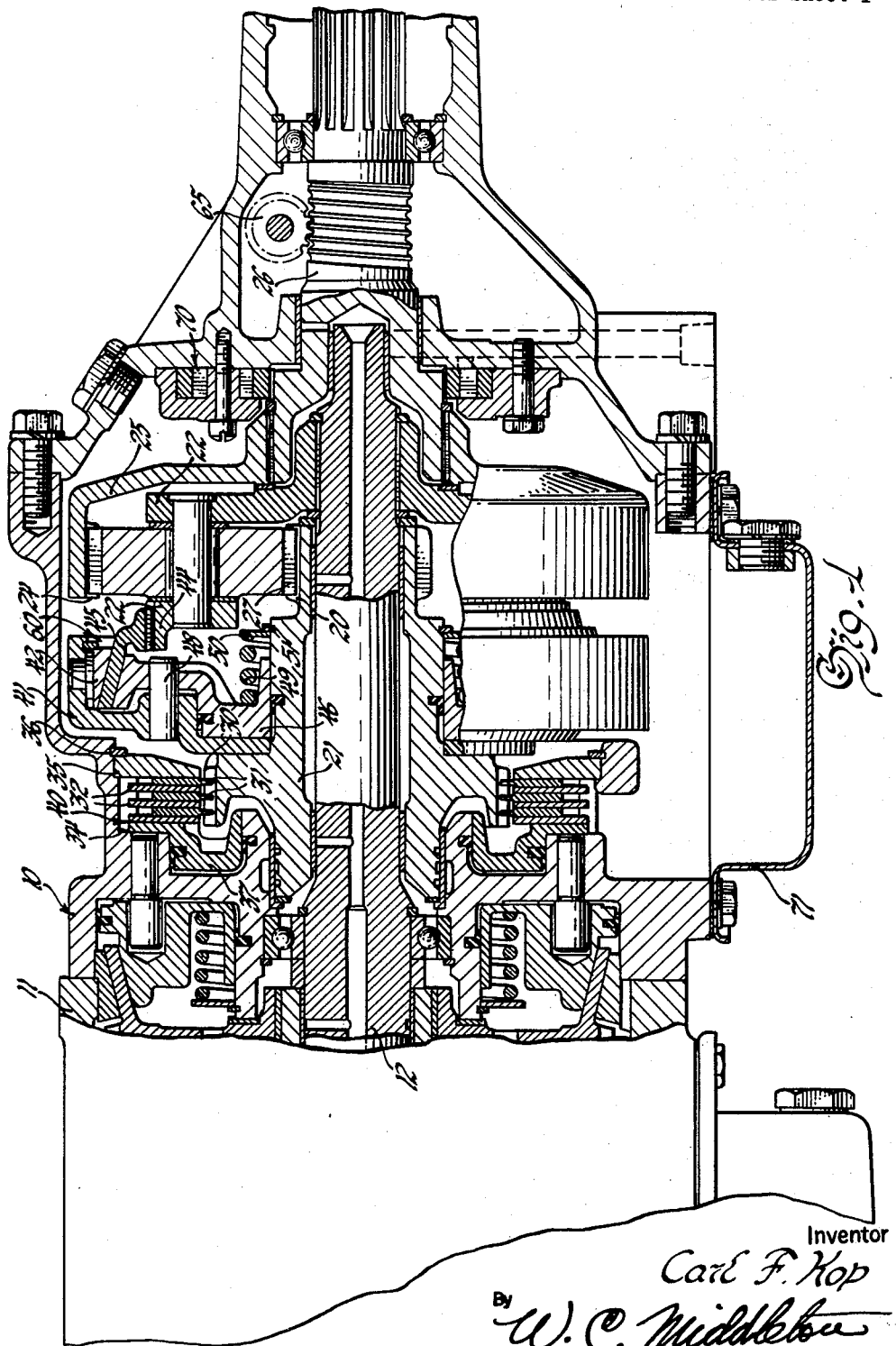

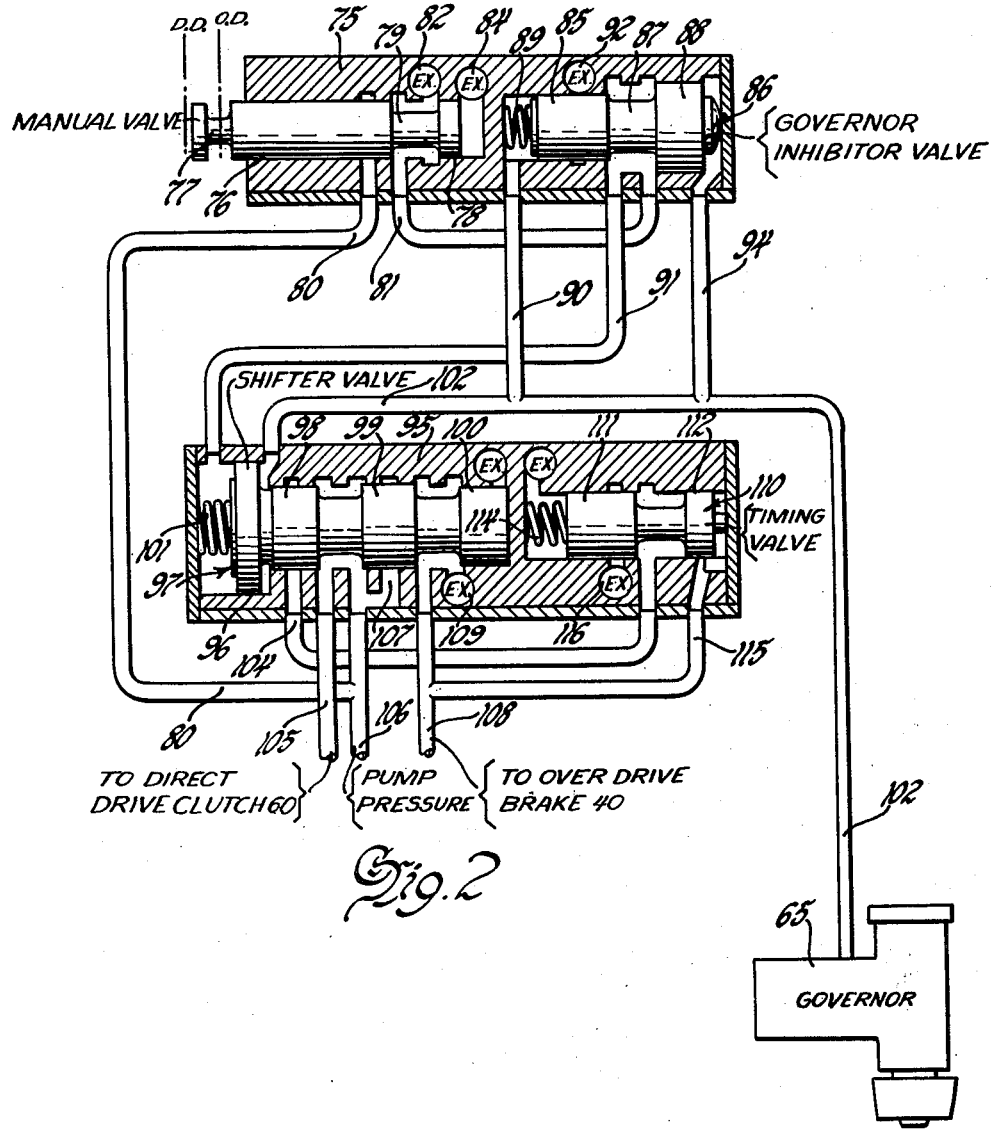

2,946,240

OVERDRIVE UNIT AND CONTROL THEREFOR

Carl F. Kop, Detroit, Mich., assignor to General Motors Corporation, Detroit, Mich., a corporation of Delaware Filed Aug. 16, 1954, Ser. No. 449,836

18 Claims. (Cl. 74—752)

This invention relates to improvements in direct drive-overdrive units for aiding in the transmission of torque between an engine and the road wheels of an automotive vehicle.

An object of the invention is to provide a planetary gear overdrive unit so controlled as to be responsive in its ratio condition to the speed of the vehicle as represented either by the speed of the unit's input shaft or its output shaft.

Another object of the invention is to provide a unit of the foregoing character having controls of such nature that it can be manually prepared for operation in overdrive ratio when suitable vehicle speed is attained.

Another object of the invention is to provide a unit of the foregoing character having hydraulic controls of such nature that the unit can be maintained in direct drive ratio by the manipulation of a manually controlled valve.

A further object of the invention is to provide controls for an overdrive unit of such character that the ratio of the unit can be varied at the will of the operator within a predetermined range of vehicle speed.

An additional object of the invention is to provide controls for an overdrive unit of such character that the unit can automatically shift from direct drive to overdrive at a predetermined vehicle speed and will be maintained in such overdrive ratio until the vehicle speed falls a predetermined amount below that at which overdrive is initiated.

A still further object of the invention is to provide controls for an overdrive unit of such nature that a manual change of ratio from overdrive to direct drive is prevented when the speed of the vehicle exceeds a predetermined maximum.

The overdrive unit of the present invention is particularly adaptable to be driven by the output shaft of a transmission of the type disclosed in the pending applications of Walter B. Herndon, S.N. 199,806, filed December 8, 1950, now Patent No. 2,763,162, dated September 18, 1956, for Transmission and Fluid Pressure Control, and S.N. 235,213, filed July 5, 1951, now Patent No. 2,790,327, dated April 30, 1957, for Transmission Control System, in that use may be made of the hydraulic governor utilized in such transmissions for control purposes in the overdrive unit, and advantage may be taken of the hydraulic pressure system incorporated in such transmission for operating brakes or clutches of the overdrive unit. The invention however is not limited to use in conjunction with such transmissions but can be used with other types of transmissions or may even be utilized alone should conditions warrant.

The unit of the present invention comprises a planetary gear set which has the planet carrier thereof driven by an input member such as the output shaft of a conventional transmission. The unit also has a sun gear which can be braked against rotation in either direction to provide the necessary reaction and which can be clutched to the carrier to rotate in unison therewith. The unit has a further element in the nature of a ring gear which is connected to the output shaft of the unit, which output shaft in turn may either constitute the propeller shaft of the vehicle or may be connected to such propeller shaft. The brake and clutch for controlling functioning of the planetary unit are hydraulically actuated, and provision is made for so controlling the actuation thereof that upon the application of one of these devices release of the other will be effectuated.

Suitable hydraulic controls are provided for this planetary unit and its clutch and brake, which controls are in the nature of a manual valve, i.e., a valve which can be manually positioned in either one of two positions by the operator of the vehicle; a shift valve which is biased to cause the elements of the transmission to operate initially in the direct drive ratio and which shift valve can automatically cause a change to the overdrive ratio when a predetermined vehicle speed has been attained. In addition, the valving includes a timing valve which functions to correlate the engagement of the overdrive brake with release of the direct drive clutch in such fashion that the transmission of torque from the engine to the road wheels of the vehicle is not interrupted. A further valve element is provided for the purpose of preventing a manual change of ratio from overdrive to direct drive when the vehicle has attained a speed so high that the engine would be endangered by such ratio change.

Other features, objects and advantages of the invention will be more readily understood by reference to the following detailed description of the accompanying drawings wherein:

Fig. 1 is a sectional view of the mechanical and hydraulic elements incorporated in the unit; and Fig. 2 is a schematic hydraulic circuit diagram of the control elements for the unit.

Referring to the drawings, 10 indicates generally a casing for the overdrive unit, which casing may be attached to casing 11 housing the main transmission employed. The terminal parts of this main transmission have been illustrated, but are not described since they constitute no part of the present invention, it being sufficient to point out that this main transmission has an output shaft 12 which serves to drive the overdrive unit.

The overdrive unit comprises a planetary gear set made up of a sun gear 20 formed on the end of an irregularly shaped tubular member 21; a planet carrier 22 which is splined to the main transmission output shaft 12 for rotation therewith; and a ring gear 24 formed on part of a substantially Z-shaped member 25 which has the hub thereof splined to the overdrive output shaft 26. The planet carrier 22 has a number of pinions 27 rotatably supported thereby and meshing both with the sun gear 20 and the ring gear 24.

The sun gear supporting tubular member 21 has a splined portion 30 receiving splined brake disks 31. Cooperating with these brake disks 31 are disks 32 splined to a part 34 of the casing 10. The complementary disks 31 and 32 are located between a backing plate 35 secured to the casing 10 by snap ring 36 and a piston 37, located in a cylinder formed in part of the casing 10. This brake, which is utilized for conditioning the planetary unit for overdrive operation, will hereinafter be referred to as the overdrive brake 40.

The sun gear supporting member 21 has secured thereto in any suitable fashion for rotation therewith an annular member 41 which has secured to the inner part of the axially extending outer portion thereof a cone-shaped member 42. The planet carrier 22 has an annular extending part 44 splined to receive, for limited movement, an extension of a cone member 45, the angularity of which conforms to that of the cone 42. The cone member 45 can be forced into contact with the cone 42 by a piston 46 located in a cylinder formed by the parts 21 and 41. The piston 46 is compelled to rotate with these parts 21 and 41 by a number of dowels 48. A spring 49 normally biases the piston 46 to the left, or in release position, such spring being confined between a part of the piston and a backing ring 50 held in place by snap ring 51. The clutch made up of the parts 42, 45 and piston 46 will be hereinafter referred to as the direct drive clutch 60, it being understood that this clutch can be engaged to lock the carrier 22 to the sun gear 20 by movement of piston 46 to the right under hydraulic pressure, resulting in a cone-shaped formation on the piston, compelling contact between the cone formations 45 and 42.

The overdrive unit output shaft 26 can have geared thereto a governor 65, and may drive a hydraulic pump indicated generally at 70, which pump may be of well-known gear type or any other type suitable for the demands of the system. Oil delivered by this pump 70 may be drawn from a sump 71, fastened to the bottom of the casing 10, by a conventional suction line not illustrated. In addition to the foregoing parts which have been mentioned in detail, the various shafts are provided with anti-friction bearings and with sleeve bearings, and other moving parts are provided with the customary oil seals which are not described in detail herein since they conform to well-known practice.

When the overdrive transmission is to be operated in direct drive, which condition will prevail during starting of the vehicle in which the transmission is mounted, such condition of the planetary unit is obtained by engagement of the direct drive clutch 60. When this clutch is engaged, the sun gear 20 and the planet carrier 22 are compelled to rotate in unison, with the result that the ring gear 24 must also rotate in unison therewith. Since the carrier 22 is driven directly by the main transmission output shaft 12, it follows that this overdrive unit output shaft 26 in this condition will also rotate at the same speed. When it is desired to operate the overdrive planetary unit in overdrive condition, the overdrive brake 40 is engaged (the direct drive clutch being released), which locks the sun gear 20 to the casing 10 against rotation. Drive of the carrier 22 therefore causes rotation of the ring gear 24 at an increased speed relative to the speed of the carrier and shaft 12, with the sun gear 20 providing the necessary reaction. The increased speed of output shaft 26 relative to shaft 12 depends on the ratio of the planetary gear set.

The manner in which the desired operation can be accomplished in the performance of this invention will be more readily understood by reference to Fig. 2 wherein the hydraulic controls therefor have been illustrated. In Fig. 2 the governor indicated at 65 in Fig. 1 is illustrated diagrammatically, it being understood that this governor is of the type illustrated and described in the copending Herndon applications before mentioned. While this governor 65 has been shown in Fig. 1 as being driven by the overdrive unit output shaft 26, it will be readily apparent that such governor can likewise be driven by the main transmission output shaft 12. The only requirement is that the governor supply oil at a pressure which increases in proportion to the increase in speed of a shaft, either input or output, to be indicative or representative of vehicle speed.

The controls for the overdrive unit comprise a valve body 75 having a bore in which is slidably mounted a manual control valve 76 having an ensmallment 77 at one end thereof for attachment to a manually controlled fork, or the like, for imparting sliding movement to the valve 76. The valve also has a land 78 separated from the main part of the member 76 by an ensmallment 79. The body 75 has a port connected to an oil line 80, a second port connected to a second oil line 81, and a third port connected to exhaust as at 82. A fourth port is also connected to exhaust at 84.

The body 75 also has a stepped bore, in the smaller part of which is mounted land 85 of a governor inhibitor valve indicated generally at 86. The part 85 is spaced by ensmallment 87 from land 88, located to slide in the larger part of the bore. A spring 89 is positioned between the end of the bore of the body 75 and the land 85 of the governor inhibitor valve, and the space receiving this spring 89 communicates with a port connected to oil line 90. The body has additional ports, one of which is connected to the oil line 81 previously mentioned, and a further port connected to oil line 91. A groove seurrounding the land 85 is connected to exhaust at 92. A further port connected to line 94 extends to the right end of the bore in body 75 to supply oil to the right end of the governor inhibitor valve 86.

A second valve body 95 is provided with a bore of stepped diameters, the larger diameter receiving land 96 of the shift valve indicated generally at 97. This shift valve 97 also has lands 98 and 99 of the same diameter and a land 100 of reduced diameter. These lands are spaced by the usual ensmallments. The left-hand end of the body 95 is provided with a port to which the oil line 91 is connected to afford communication with the end area of the land 96, and the space in the valve body containing this land 96 also has positioned therein a biasing spring 101. Another port in the valve body 95 has connected thereto oil line 102 which extends to the governor 65 and which has the branch lines 90 and 94 in communication therewith. A port in valve body 95 is connected to oil line 104; another port is connected to line 105 which extends to the direct drive clutch 60. Another port is connected to the pump supply line 106, to which the branch line 80, previously mentioned, is connected. The port connected to pump supply line 106 has a by-pass channel indicated at 107. A further port in the valve body is connected to oil line 108 which extends to the overdrive brake 40. Other ports in valve body 95 are connected to exhaust, as shown.

The valve body 95 also has a second bore in which is slidably mounted a timing valve indicated generally at 110, which valve has spaced lands 111 and 112. A spring 114 biases this timing valve 110 to the right. A port leading to the bore between lands 111 and 112 is connected to the oil line 104, before mentioned. A further port is connected to oil line 115 which constitutes a branch from the overdrive brake supply line 108. A further port is connected to exhaust at 116.

*Operation*

The manual valve 76 is constructed to be operated at the will of the operator and has two positions. One of the positions is that shown in Fig. 2, while the other position constitutes a movement of the valve to the left until the center line of the ensmallment 77 coincides with the line DD. The manual valve may be controlled through the agency of a Bowden wire extending to the control panel of the vehicle or by any other manually operable mechanism or linkage for imparting movement to the valve.

If the operator of the vehicle desires the drive unit to function automatically as an overdrive unit, the valve 76 is placed in the position shown in Fig. 2. Under these conditions the other valves 86, 97 and 110 also assume the positions shown. As the result of these positions oil supplied by the pump 70, or from any other suitable source, is fed through line 106 to the valve 97 and thence through line 105 to the direct drive clutch 60 (through suitable passages not shown) to cause movement of piston 46 to the right, engaging the direct drive clutch 60. Inasmuch as the pump 70 is shown as being driven by the overdrive unit output shaft, it will be evident that initially oil under pressure from another source such as a pump associated with the main transmission must necessarily be supplied to line 106 to engage clutch 60. Oil from the supply line 106 also enters the line 80 and continues to the valve body 75, at which point it is arrested by the main land of manual valve 76. Lines 81 and 91, in communication with each other and also in communication with the left-hand end of the bore in valve body 95, are connected to exhaust at 82 and hence no pressure is exerted on the end of land 96 except that supplied by spring 101. Line 108, which extends through suitable channels to the overdrive brake 40, is exhausted by the passage 109 connected thereto through the bore of the body 96. While the vehicle is at rest the governor 65 is inoperative and hence there is no supply of oil through line 102 or its branches 90 and 94. As the vehicle is accelerated, the direct drive clutch is maintained engaged, and the pressure developed by governor 65 increases progressively with increase in speed. This oil under pressure is directed through line 102 to the right surface of land 96 to exert pressure opposing the spring 101. Oil under the same governor pressure is also fed to each end of the governor inhibitor valve 86. When the vehicle attains a speed at which point it is desired to cause the transmission to shift from direct drive to overdrive, the governor pressure which is representative of vehicle speed attains a pressure high enough to move the shift valve 97 to the left against the resistance of spring 101. When such movement occurs, land 98 uncovers the port connected to line 104 while land 99 covers the port directly in line with supply passage 106. At the same time land 99 uncovers the branch channel 107, placing it in communication with the line 108 extending to the overdrive brake 40. In this fashion the supply line 106 is connected to the brake line 108 for the immediate supply of oil under pressure to the piston 37 of that brake. Inasmuch as it is desirable that the overdrive unit be shifted from direct drive to overdrive without interrupting the transmission of torque therethrough, provision is made for timing the exhaust of the direct drive clutch with the application of the overdrive brake. For this purpose the branch line 115 from the line 108 permits the supply of oil furnished the brake to be shunted to the right end of land 112 of the timing valve 110. As the result of this branch passage and the timing valve, the direct drive clutch is not exhausted until the pressure of the oil being delivered to the overdrive brake rises sufficiently to move the timing valve 110 to the left against spring 114. These parts are so calibrated that spring 114 will be overcome when the pressure of oil supplied to the overdrive brake piston 37 is high enough to complete engagement of the brake.

Movement of the timing valve 110 to the left connects line 104 to exhaust at passage 116 and, since line 104 is in communication, through the valve bore between lands 98 and 99, with line 105 leading to the direct drive clutch, this connection permits the immediate exhaust of the direct drive clutch as the overdrive brake completes its engagement. In this fashion uninterrupted torque transmission through the overdrive unit is accomplished.

It should be noted that the land 99 is of larger diameter than the land 100 so that when the shift valve 97 has moved to the left to apply the overdrive brake, the oil passing through the bore of the shift valve body exerts pressure on areas of different dimensions. In other words, the pressure exerted by the oil being delivered to the overdrive brake and acting on land 99 has a larger area to act upon than the area of land 100 so affected. The end result of this unbalance of areas is to delay a return movement of the shift valve until the governor pressure which caused the shift to overdrive condition has fallen below the pressure necessary for the initial shift. This so-called hysteresis commonly practiced in transmissions of hydraulic nature assures a downshift at a lower vehicle speed than that at which an upshift will occur. For example, if the parts are so calibrated as to cause an upshift, i.e., from direct drive to overdrive at a vehicle speed of around 35 m.p.h., the unbalanced areas or hysteresis will hold the unit in overdrive until the vehicle has decelerated to a speed of from 28 to 30 m.p.h.

Inasmuch as the present invention makes provision for manually changing the ratio in the overdrive unit at the will of the operator, as a safeguard for the engine of the vehicle provision is made for preventing a manual shift from overdrive ratio to direct drive when the vehicle has reached a speed resulting from an engine speed which latter speed could not be increased by return to direct drive without endangering the engine. To this end, when the vehicle speed reaches a predetermined value which is represented by a governor pressure of a predetermined value, such oil under pressure being fed to both ends of the governor inhibitor valve 86 will be at a value at which the pressure exerted on the right end of land 88 will be greater than the oil pressure, plus spring pressure on the left end of land 85. The inhibitor valve 86 thereupon is moved to the left so that land 88 closes the port connected to line 81. At the same time, the line 91 will be connected to exhaust at 92, forestalling the accumulation of any hydraulic pressure in the bore to the left of the land 96 of the shift valve 97. Therefore, should the manual valve 76 be moved to the direct drive position by the operator of the vehicle, it will be seen that oil under pump pressure supplied through the line 80 can continue through line 81 to the land 88 but will be arrested at this point. Under these conditions it is impossible to manually change the ratio in the overdrive unit from overdrive ratio to direct drive until governor pressure representative of vehicle speed drops below the predetermined critical value.

Should the operator of the vehicle desire to operate the overdrive unit in direct drive ratio at any time other than that just described, such operation can be effected by movement of the manual valve 76 to the direct drive position, which movement immediately establishes communication between the pump supply line 106 and the bore of the shift valve to the left of land 96 by way of lines 80, 81 and 91; it being understood that the governor inhibitor valve 86 is in the position shown in Fig. 2. The supply of oil under pump pressure to the shift valve 97, as just described, applies a force to the left end thereof of such magnitude that the valve 97 cannot be moved thereagainst, even with maximum governor pressure. Consequently, the shift valve 97 will remain in the Fig. 2 position, maintaining direct drive ratio in the planetary unit.

Should the unit be operating in overdrive ratio and at a vehicle speed below the critical speed which will cause actuation of governor inhibitor valve 86, the operator may manually cause a change in ratio by actuation of the manual valve to the direct drive position, which causes it to produce a supply of oil under pump pressure to the left end of land 96 of valve 97 in the manner just described, which will exert a force on the shift valve 97 great enough to overwhelm the force of governor pressure in line 102 in opposition thereto. The shift valve 97 then will be moved from the overdrive position to the direct drive position shown in Fig. 2.

If the manual valve 76 is in the direct drive position, the operator may manually move the same to overdrive position at any time. With the transmission operating in overdrive the manual valve can be moved to the direct drive position but if the vehicle speed is above the predetermined maximum speed at such time, the unit will remain in overdrive until the vehicle speed falls below the predetermined maximum. Should the vehicle speed be above the shift point, the unit will automatically be shifted to the overdrive ratio. Should the vehicle speed be above the predetermined mavimum speed, the unit will remain in direct drive until the vehicle speed falls below the predetermined maximum. This action is due to the operation of the inhibitor valve before described, which serves to prevent a downshift from overdrive to direct drive whenever governor pressure is representative of an extremely high vehicle speed.

While the manual valve 76 is in direct drive position, oil under pump pressure is supplied from the line 106 through lines 80 and 81 to the space between the lands 85 and 88 of the governor inhibitor valve 86. These lands are of different diameters and hence the oil exerts a greater force on land 88 than on land 85. Consequently, having oil at high pump pressure acting on land 88, it is impossible for governor pressure delivered to the other end of land 88 by line 94 to move the governor inhibitor valve to the left, which movement would cause an undesirable arresting of pump pressure being supplied through the line 91 to the shift valve 97. As the result of this hydraulic action on unbalanced areas of the lands 85 and 88, undesirable shift from direct drive to overdrive is prevented.

It should be noted that since operation of the overdrive unit, both for upshifting and downshifting, is dependent in the automatic stages upon car speed, the condition of a main transmission preceding the overdrive unit will have no effect on this unit. Furthermore, it is evident that change of ratio in the main transmission can be accomplished while the unit remain in overdrive ratio so long as the vehicle speed does not fall below the downshift point.

This overdrive unit has a further advantage in that the ratio determining element thereof, either the direct drive clutch or the overdrive brake, will remain engaged at all times so that vehicle overrun will cause a reverse transmission of torque through the unit, thereby permitting utilization of engine braking.

Engine braking will be afforded through the unit in either direct drive condition thereof, or overdrive condition thereof. The provision of the cone clutch for direct drive and the disk brake for overdrive assures holding of gear elements by these devices regardless of the direction of rotation through the unit. Thus it will be obvious that in addition to providing the desired ratios in forward drive these same ratios can be effective in reverse drive, it being understood that the overdrive condition will be attained only at proper vehicle speed. Should the calibration of the controls require a higher speed than is customary for reverse drive, such calibration can be changed, by changing valve diameters or spring strength to cause shift from direct drive to overdrive at any desired vehicle speed. For example, the parts can be calibrated in such fashion that a shift from direct drive to overdrive will occur at a speed of, for example, 20 m.p.h. instead of 35 m.p.h.

As pointed out hereinbefore, it is necessary to provide a supply of oil under pressure before the vehicle begins movement and therefore some engine driven pump must be provided for this purpose. If the unit is used in association with a hydraulically operated transmission it will be evident that the supply of oil for this transmission can be utilized for the operation of this unit. Should the unit, however, be used in association with a manually operated transmission, it will be evident that an engine driven pump must be provided in order that the torque train through the unit can be completed. The pump 70, therefore, while supplying oil after vehicle motion has been initiated, is primarily provided for the purpose of assuring a supply of oil under pressure for a so-called push or tow start. This pump also serves to return oil to the regular transmission if that transmission is of the hydraulically actuated type.

It is to be understood that modifications beyond the illustrated embodiment can be made without departing from the scope of the invention as defined in the following claims.

What is claimed is:

1. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation to condition said gear set for overdrive of said output shaft, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, means biasing said shift valve means to position to apply said clutch means and to exhaust said brake means, governor means delivering hydraulic pressure varying with the speed of one of said shafts, and means for supplying said varying hydraulic pressure to said valve means for actuating said valve means to exhaust said clutch means and apply said brake means in response to a predetermined hydraulic pressure from said governor means.

2. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, governor means delivering hydraulic pressure varying with the speed of one of said shafts, means for supplying said varying hydraulic pressure to said valve means for actuating said valve means to exhaust said clutch means and apply said brake means in response to a predetermined hydraulic pressure from said governor means, and biasing means opposing said varying hydraulic pressure for actuating said valve means to apply said clutch means and to exhaust said brake means when said varying hydraulic pressure falls to a predetermined value.

3. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, means biasing said shift valve means to position to apply said clutch means and to exhaust said brake means, and a manually operated valve having two positions, in one of which said manually operated valve compels said shift valve to maintain said clutch means applied with said brake means exhausted, and in the other of which said manually operated valve removes said compulsion on said shift valve.

4. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, means biasing said shift valve means to position to apply said clutch means and to exhaust said brake means, a manually operated valve having two positions, in one of which said manually operated valve compels said shift valve to maintain said clutch means applied with said brake means exhausted, and in the other of which said manually operated valve removes said compulsion on said shift valve, and governor means delivering hydraulic pressure varying with the speed of one of said shafts, said varying pressure acting on said shift valve to actuate it to exhaust said clutch means while applying said brake means upon a predetermined value of said varying pressure when said manual valve is in the second of said positions.

5. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation to condition said gear set for overdrive of said output shaft, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, and yieldable biasing means normally holding said shift valve in position connecting said clutch means to said source of hydraulic pressure and connecting said brake means to exhaust.

6. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, and a manually operated valve having two positions, in one of which it connects said source of hydraulic pressure to said shift valve to aid said biasing means, and in the other of which it interrupts said last mentioned connection.

7. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, a manually operated valve having two positions, in one of which it connects said source of hydraulic pressure to said shift valve to aid said biasing means, and in the other of which it interrupts said last mentioned connection, governor means delivering hydraulic pressure varying with the speed of one of said shafts, and an inhibitor valve between said manually operated valve and said shift valve, said inhibitor valve being movable in response to a predetermined governor pressure to block the hydraulic connection between said valves.

8. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, and a governor delivering hydraulic pressure varying with the speed of one of said shafts, said varying pressure being connected to said shift valve to oppose said yieldable biasing means for moving said shift valve upon a predetermined pressure from said governor to a position connecting said brake means to said source of hydraulic pressure and connecting said clutch means to exhaust.

9. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, a governor delivering hydraulic pressure varying with the speed of one of said shafts, said varying pressure being connected to said shift valve to oppose said yieldable biasing means for moving said shift valve upon a predetermined pressure from said governor to a position connecting said brake means to said source of hydraulic pressure and connecting said clutch means to exhaust, and a timing valve for delaying the connection of said clutch means to exhaust until the hydraulic pressure to said brake means reaches a predetermined value.

10. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, a governor delivering hydraulic pressure varying with the speed of one of said shafts, said varying pressure being connected to said shift valve to oppose said yieldable biasing means for moving said shift valve upon a predetermined pressure from said governor to a position connecting said brake means to said source of hydraulic pressure and connecting said clutch means to exhaust, and a manually operated valve movable between positions establishing and interrupting a connection between said source of hydraulic pressure and said shift valve to aid said biasing means and thereby to prevent movement of said shift valve in response to pressure from said governor.

11. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, a governor delivering hydraulic pressure varying with the speed of one of said shafts, said varying pressure being connected to said shift valve to oppose said yieldable biasing means for moving said shift valve upon a predetermined pressure from said governor to a position connecting said brake means to said source of hydraulic pressure and connecting said clutch means to exhaust, a manually operated valve movable between positions establishing and interrupting a connection between said source of hydraulic pressure and said shift valve to aid said biasing means and thereby to prevent movement of said shift valve in response to pressure from said governor, and an inhibitor valve movable upon predetermined pressure from said governor to a position preventing establishment of said connection between said source of hydraulic pressure and said shift valve.

12. An overdrive unit for transmitting torque comprising an input shaft, an output shaft, a planetary gear set having an input element connected to said input shaft, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means for connecting either said brake means or said clutch means to said source of hydraulic pressure for the application of one thereof while hydraulic pressure is exhausted from the other thereof, yieldable biasing means normally holding said shift valve in position connecting said clutch means to said source of hydraulic pressure and connecting said brake means to exhaust, a governor delivering hydraulic pressure varying with the speed of one of said shafts, said varying pressure being connected to said shift valve to oppose said yieldable biasing means for moving said shift valve upon a predetermined governor pressure to a position connecting said brake means to said source of hydraulic pressure and connecting said clutch means to exhaust, and an inhibitor valve movable upon predetermined pressure from said governor to prevent a forced movement of said shift valve from its last mentioned position.

13. An overdrive unit for transmitting torque comprising an input shaft, an output shaft, a planetary gear set having an input element connected to said input shaft, said input element comprising a planet pinion carrier, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means having a position connecting said brake means to said source of hydraulic pressure and said clutch means to exhaust for overdrive through said unit, and another position connecting said clutch means to said source of hydraulic pressure and said brake means to exhaust for direct drive through said unit, yieldable biasing means normally holding said shift valve in its direct drive position, and a governor supplying hydraulic pressure varying with the speed of one of said shafts to said shift valve to move it against said biasing means thereby to move said shift valve from direct drive position to overdrive position.

14. An overdrive unit for transmitting torque comprising an input shaft, an output shaft, a planetary gear set having an input element connected to said input shaft, said input element comprising a planet pinion carrier, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means having a position connecting said brake means to said source of hydraulic pressure and said clutch means to exhaust for overdrive through said unit, and another position connecting said clutch means to said source of hydraulic pressure and said brake means to exhaust for direct drive through said unit, yieldable biasing means normally holding said shift valve in its direct drive position, and a governor supplying hydraulic pressure varying with the speed of one of said shafts to said shift valve to move it against said biasing means thereby to move said shift valve from direct drive position to overdrive position, said shift valve having unbalanced areas subject to the hydraulic pressure supplied to said brake means to hold said shift valve in overdrive position until the pressure from said governor falls to a predetermined lower value than that which caused movement of the shift valve to its overdrive position.

15. An overdrive unit for transmitting torque comprising an input shaft, an output shaft, a planetary gear set having an input element connected to said input shaft, said input element comprising a planet pinion carrier, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means having a position connecting said brake means to said source of hydraulic pressure and said clutch means to exhaust for overdrive through said unit, and another position connecting said clutch means to said source of hydraulic pressure and said brake means to exhaust for direct drive through said unit, yieldable biasing means normally holding said shift valve in its direct drive position, a governor supplying hydraulic pressure varying with the speed of one of said shafts to said shift valve to move it against said biasing means thereby to move said shift valve from direct drive position to overdrive position, and a timing valve subject to the hydraulic pressure supplied to said brake means and delaying exhaust of said clutch means until said pressure supplied to said brake means is high enough to complete the application thereof.

16. An overdrive unit for transmitting torque comprising an input shaft, an output shaft, a planetary gear set having an input element connected to said input shaft, said input element comprising a planet pinion carrier, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means having a position connecting said brake means to said source of hydraulic pressure and said clutch means to exhaust for overdrive through said unit, and another position connecting said clutch means to said source of hydraulic pressure and said brake means to exhaust for direct drive through said unit, yieldable biasing means normally holding said shift valve in its direct drive position, a governor supplying hydraulic pressure varying with the speed of one of said shafts to said shift valve to move it against said biasing means thereby to move said shift valve from direct drive position to overdrive position, and a manually controlled valve having a direct drive position in which it connects said source of hydraulic pressure to said shift valve to aid said biasing means and prevent movement of said shift valve from its direct drive position to its overdrive position.

17. An overdrive unit for transmitting torque comprising an input shaft, an output shaft, a planetary gear set having an input element connected to said input shaft, said input element comprising a planet pinion carrier, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means having a position connecting said brake means to said source of hydraulic pressure and said clutch means to exhaust for overdrive through said unit, and another position connecting said clutch means to said source of hydraulic pressure and said brake means to exhaust for direct drive through said unit, yieldable biasing means normally holding said shift valve in its direct drive position, a governor supplying hydraulic pressure varying with the speed of one of said shafts to said shift valve to move it against said biasing means thereby to move said shift valve from direct drive position to overdrive position, and a manually controlled valve having a direct drive position in which it connects said source of hydraulic pressure to said shift valve to aid said biasing means and prevent movement of said shift valve from its direct drive position to its overdrive position, said manually controlled valve having an overdrive position in which it interrupts connection between said source of hydraulic pressure and said shift valve in aid of said biasing means whereby said shift valve is automatically movable in response to hydraulic pressure from said governor.

18. An overdrive unit for transmitting torque comprising an input shaft, an output shaft, a planetary gear set having an input element connected to said input shaft, said input element comprising a planet pinion carrier, an output element connected to said output shaft, and a reaction element, hydraulically operated brake means for holding said reaction element against rotation, hydraulically operated clutch means for connecting together two of the elements of said gear set to cause all of the elements to rotate in unison, a source of hydraulic pressure, shift valve means having a position connecting said brake means to said source of hydraulic pressure and said clutch means to exhaust for overdrive through said unit, and another position connecting said clutch means to said source of hydraulic pressure and said brake means to exhaust for direct drive through said unit, yieldable biasing means normally holding said shift valve in its direct drive position, a governor supplying hydraulic pressure varying with the speed of one of said shafts to said shift valve to move it against said biasing means thereby to move said shift valve from direct drive position to overdrive position, a manually controlled valve having a direct drive position in which it connects said source of hydraulic pressure to said shift valve to aid said biasing means and prevent movement of said shift valve from its direct drive position to its overdrive position, said manually controlled valve having an overdrive position in which it interrupts connection between said source of hydraulic pressure and said shift valve in aid of said biasing means whereby said shift valve is automatically movable in response to hydraulic pressure from said governor, and an inhibitor valve movable by predetermined hydraulic pressure from said governor to prevent supply of hydraulic pressure to said shift valve in aid of said biasing means whereby movement of said manually controlled valve from its overdrive position to its direct drive position is ineffective to cause a corresponding movement of said shift valve when the speed of the shaft driving said governor exceeds a predetermined maximum.

References Cited in the file of this patent

UNITED STATES PATENTS

| | | |
|---|---|---|
| 2,115,964 | Osborne | May 3, 1938 |
| 2,177,872 | Dunn | Oct. 30, 1939 |
| 2,311,209 | Carnagua | Feb. 16, 1943 |
| 2,399,097 | Carnagua | Apr. 23, 1946 |
| 2,510,469 | Greenlee | June 6, 1950 |
| 2,516,208 | Hasbany | July 25, 1950 |
| 2,568,135 | Vincent | Sept. 18, 1951 |
| 2,640,373 | Jandasek | June 2, 1953 |
| 2,689,029 | McFarland | Sept. 14, 1954 |
| 2,693,260 | Lucia | Nov. 2, 1954 |
| 2,693,711 | Kelbel et al. | Nov. 9, 1954 |
| 2,743,626 | Schjolin | May 1, 1956 |
| 2,749,775 | Simpson | June 12, 1956 |

FOREIGN PATENTS

| | | |
|---|---|---|
| 676,055 | Great Britain | July 23, 1952 |
| 702,054 | Great Britain | Jan. 6, 1954 |